United States Patent
Wang et al.

(10) Patent No.: US 10,686,221 B2
(45) Date of Patent: Jun. 16, 2020

(54) ELECTROLYTE AND ELECTROCHEMICAL ENERGY STORAGE DEVICE

(71) Applicant: CONTEMPORARY AMPEREX TECHNOLOGY CO., LIMITED, Ningde (CN)

(72) Inventors: Xiaomei Wang, Ningde (CN); Chenghua Fu, Ningde (CN); Changlong Han, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 32 days.

(21) Appl. No.: 16/027,009

(22) Filed: Jul. 3, 2018

(65) Prior Publication Data

US 2019/0036169 A1  Jan. 31, 2019

(30) Foreign Application Priority Data

Jul. 27, 2017  (CN) .......................... 2017 1 0624391

(51) Int. Cl.
| | |
|---|---|
| *H01M 10/052* | (2010.01) |
| *H01M 10/0525* | (2010.01) |
| *H01M 10/0567* | (2010.01) |
| *H01M 10/0569* | (2010.01) |
| *H01G 11/64* | (2013.01) |
| *H01M 10/0565* | (2010.01) |
| *H01M 4/525* | (2010.01) |
| *H01M 4/583* | (2010.01) |
| *H01M 10/48* | (2006.01) |
| *H01M 4/505* | (2010.01) |
| *H01M 4/02* | (2006.01) |

(52) U.S. Cl.
CPC ........ *H01M 10/0567* (2013.01); *H01G 11/64* (2013.01); *H01M 4/505* (2013.01); *H01M 4/525* (2013.01); *H01M 4/583* (2013.01); *H01M 10/052* (2013.01); *H01M 10/0525* (2013.01); *H01M 10/0565* (2013.01); *H01M 10/0569* (2013.01); *H01M 10/48* (2013.01); *H01M 2004/027* (2013.01); *H01M 2004/028* (2013.01); *H01M 2300/0025* (2013.01); *H01M 2300/0082* (2013.01)

(58) Field of Classification Search
CPC ...... H01G 11/64; H01M 4/505; H01M 4/525; H01M 4/583; H01M 10/052; H01M 10/0525; H01M 10/0565; H01M 10/0567; H01M 10/0569; H01M 10/48; H01M 2004/027; H01M 2004/028; H01M 2300/0025; H01M 2300/0082

See application file for complete search history.

(56) References Cited

U.S. PATENT DOCUMENTS

| | | | | |
|---|---|---|---|---|
| 2010/0304225 | A1* | 12/2010 | Pascaly | ........... H01G 11/62 429/342 |
| 2012/0328960 | A1* | 12/2012 | Ito | ........... H01G 11/60 429/336 |
| 2014/0193707 | A1 | 7/2014 | Schmidt et al. | |
| 2016/0036092 | A1 | 2/2016 | Ye et al. | |
| 2016/0351900 | A1* | 12/2016 | Sekiya | ........... H01M 4/483 |
| 2017/0179527 | A1* | 6/2017 | Schmitz | ........... H01M 4/587 |

FOREIGN PATENT DOCUMENTS

| | | |
|---|---|---|
| CN | 105845981 A | 8/2016 |
| CN | 105845981 A | 8/2016 |
| CN | 105932332 A | 9/2016 |
| WO | WO 2013/026854 A1 | 2/2013 |
| WO | WO 2015/150390 A1 | 10/2015 |

OTHER PUBLICATIONS

Machine translation of CN 105845981A, published on Aug. 10, 2016 (Year: 2016).*
Machine translation of the abstract of CN 105845981A, published on Aug. 10, 2016 (Year: 2016).*
Contemporary Amperex Technology Co., Limited, Extended European Search Report, EP18185399.5, dated Dec. 11, 2018, 7 pgs.

\* cited by examiner

*Primary Examiner* — Anca Eoff

(74) *Attorney, Agent, or Firm* — Morgan, Lewis & Bockius LLP

(57) ABSTRACT

The present disclosure provides an electrolyte and an electrochemical energy storage device. The electrolyte comprises an electrolyte salt and an additive. The additive comprises a sulfonic ester cyclic quaternary ammonium salt and a dioxide heterocyclic compound. Under the combined effect of the sulfonic ester cyclic quaternary ammonium salt and the dioxide heterocyclic compound, a dense, uniform and stable passive film on a surface of each of the positive electrode film and the negative electrode film of the electrochemical energy storage device, thereby reducing the contact between the positive, negative electrode active materials and the electrolyte, thus avoiding the occurrence of continuous oxidation and reduction reaction of the electrolyte on the surface of each of the positive electrode film and the negative electrode film, so as to make the electrochemical energy storage device has excellent high temperature storage performance and high temperature cycle performance.

2 Claims, No Drawings

ELECTROLYTE AND ELECTROCHEMICAL ENERGY STORAGE DEVICE

CROSS-REFERENCE TO RELATED APPLICATIONS

The present application claims priority to Chinese patent application No. CN201710624391.8, filed on Jul. 27, 2017, which is incorporated herein by reference in its entirety.

FIELD OF THE PRESENT DISCLOSURE

The present disclosure relates to the field of energy storage device, and more specifically relates to an electrolyte and an electrochemical energy storage device.

BACKGROUND OF THE PRESENT DISCLOSURE

With the increasing depletion of fossil fuels and increasing pressure on environmental pollution, automotive industry urgently needs a new type energy resource to provide driving force for automobiles, and lithium-ion battery is talent showing itself due to its high energy density, no memory effect and high operating voltage, which makes the lithium-ion battery become a first choice for a power supply of the new energy vehicles at present. However, with expansion of the market demand for electronic products and development of power device and energy storage device, people's demand for the lithium-ion battery is continuously increasing, developing high energy density and fast charge-discharge lithium-ion battery becomes an urgent matter. At present, an effective method is to increase voltage and press density of an electrode active material and select appropriate electrolyte.

When the energy density of the lithium-ion battery is increased in order to meet requirements of use (such as improve the voltage of the lithium-ion battery), it is equivalent to increase an uncertainty of safety performance of the lithium-ion battery. For example, when lithium-ion battery is used under high temperature, oxidation and reduction reactions of the electrolyte will occurred acutely on the positive electrode film and negative electrode film and a large amount of gas will be generated, which will cause expansion of the lithium-ion battery. This will not only lead to damage of the lithium-ion battery, but also lead to damage of a device using the lithium-ion battery, even seriously, due to the expansion and deformation of the lithium-ion battery, a short circuit inside the lithium-ion battery will occur, or the electrolyte which is flammable will be leaked due to the swelling and bursting of the lithium-ion battery case, which will lead to a risk of fire and other safety accidents. Therefore, an effective technology is required to solve the problem of decomposition of the electrolyte and the problem of swelling of the lithium-ion battery.

SUMMARY OF THE PRESENT DISCLOSURE

In view of the problem existing in the background, an object of the present disclosure is to provide an electrolyte and an electrochemical energy storage device, the electrochemical energy storage device has excellent high temperature storage performance and high temperature cycle performance.

In order to achieve the above object, in a first aspect of the present disclosure, the present disclosure provides an electrolyte. The electrolyte comprises an electrolyte salt and an additive. The additive comprises a sulfonic ester cyclic quaternary ammonium salt and a dioxide heterocyclic compound.

In order to achieve the above object, in a second aspect of the present disclosure, the present disclosure provides an electrochemical energy storage device which comprises the electrolyte according to the first aspect of the present disclosure.

Compared to the technology in the background, the present disclosure has the following beneficial effects: the additive of the electrolyte of the present disclosure comprises the sulfonic ester cyclic quaternary ammonium salt and the dioxide heterocyclic compound, the additive can form a dense, uniform and stable passive film on a surface of each of the positive electrode film and the negative electrode film of the electrochemical energy storage device, particularly the additive can form a dense solid electrolyte interface film (SEI film) with low impedance on the surface of the negative electrode film, thereby reducing the contact between the positive, negative electrode films and the electrolyte, thus avoiding the occurrence of continuous oxidation and reduction reaction of the electrolyte on the surface of each of the positive electrode film and the negative electrode film, and further reducing decomposition of the electrolyte and increase of the internal resistance of the electrochemical energy storage device, so as to make the electrochemical energy storage device have excellent high temperature storage performance and high temperature cycle performance.

DETAILED DESCRIPTION

Hereinafter an electrolyte and an electrochemical energy storage device according to the present disclosure will be described in detail.

Firstly, an electrolyte of a first aspect of the present disclosure will be described.

The electrolyte according to the first aspect of the present disclosure comprises an electrolyte salt and an additive. The additive comprises a sulfonic ester cyclic quaternary ammonium salt and a dioxide heterocyclic compound.

In the electrolyte according to the first aspect of the present disclosure, the sulfonic ester cyclic quaternary ammonium salt is one or more selected from a group consisting of compounds represented by formula 1; in the formula 1, $R_{11}$ is one selected from a group consisting of —CN, C1~C12 alkyl group, C1~C12 alkyl group substituted with a substituent, C2~C12 alkenyl group, C2~C12 alkenyl group substituted with the substituent, C2~C12 alkynyl group, C2~C12 alkynyl group substituted with the substituent, C1~C12 alkoxy group, C1~C12 alkoxy group substituted with the substituent, C1~C12 acyloxy group and C1~C12 acyloxy group substituted with the substituent; $R_{12}$ is one selected from a group consisting of C1~C12 alkylene group, C1~C12 alkylene group substituted with the substituent, C2~C12 alkenylene group, C2~C12 alkenylene group substituted with the substituent, C2~C12 alkynylene group, C2~C12 alkynylene group substituted with the substituent, C1~C12 alkylenoyl group and C1~C12 alkylenoyl group substituted with the substituent; $R_{13}$ is one selected from a group consisting of C1~C12 alkyl group, C1~C12 alkyl group substituted with the substituent, C2~C12 alkenyl group, C2~C12 alkenyl group substituted with the substituent, C2~C12 alkynyl group, C2~C12 alkynyl group substituted with the substituent, C1~C12 alkoxy group, C1~C12 alkoxy group substituted with the substituent, C1~C12 acyloxy group, C1~C12 acyloxy group substituted with the substituent, C6~C22 aryl group, C6~C22 aryl group substituted with the substituent, C5~C22 heteroaryl group and C5~C22 heteroaryl group substituted with the substituent; $R_{14}$ is selected from a group consisting of C1~C3 alkylene group and C1~C3 alkylene group substituted with the substituent; the substituent is one or more selected from a group consisting of —CN and halogen atom.

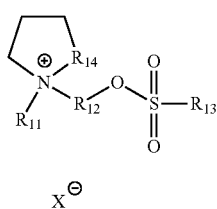

formula 1 in the formula 1, $X^\ominus$ represents an anion, $X^\ominus$ is one selected from a group consisting of $F^-$, $NO_3^-$, $SO_4^{2-}$, $PF_6^-$, $PF_4^-$, $AsF_6^-$, $(FSO_2)_2N^-$,

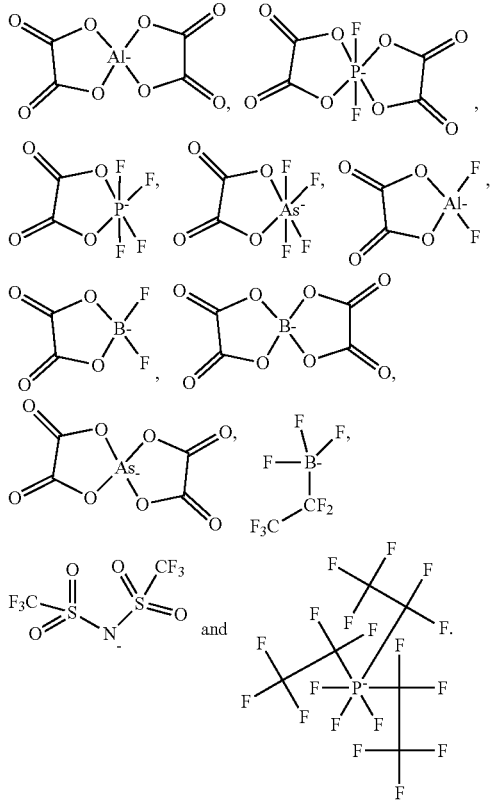

In the electrolyte according to the first aspect of the present disclosure, the dioxide heterocyclic compound may be one selected from a group consisting of five-membered cyclic compound, six-membered cyclic compound, seven-membered cyclic compound and eight-membered cyclic compound. Preferably, the dioxide heterocyclic compound may be one selected from a group consisting of five-membered cyclic compound, six-membered cyclic compound and seven-membered cyclic compound. Further preferably, the dioxide heterocyclic compound may be one selected from a group consisting of five-membered cyclic compound and six-membered cyclic compound. Here, nomenclature of five-membered cyclic compound, six-membered cyclic compound, seven-membered cyclic compound and eight-membered cyclic compound depends on the atom number on the cycle of the dioxide heterocyclic compound. Specifically, the dioxide heterocyclic compound may be one or more selected from a group consisting of compounds represented by formula 2 and formula 3; in formula 2, a is an integer of 1~3, $R_{21}$, $R_{22}$, $R_{23}$ and $R_{24}$ each independently are one selected from a group consisting of H, halogen atom, cyano group, carboxyl group, sulfonic group, C1~C20 alkyl group, halogenated C1~C20 alkyl group, C2~C20 unsaturated hydrocarbyl group and halogenated C2~C20 unsaturated hydrocarbyl group; in formula 3, b is an integer of 1~3, $R_{31}$, $R_{32}$, $R_{33}$, $R_{34}$ and $R_{35}$ each independently are one selected from a group consisting of H, halogen atom, cyano group, carboxyl group, sulfonic group, C1~C20 alkyl group, halogenated C1~C20 alkyl group, C2~C20 unsaturated hydrocarbyl group and halogenated C2~C20 unsaturated hydrocarbyl group, where, the halogen atom is F, Cl, Br or I.

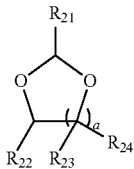

formula 2

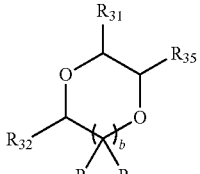

formula 3

In the electrolyte according to the first aspect of the present disclosure, the electrolyte may be a liquid electrolyte, a solid polymer electrolyte or a gel polymer electrolyte.

In the electrolyte according to the first aspect of the present disclosure, the sulfonic ester cyclic quaternary ammonium salt and the dioxide heterocyclic compound can form a dense, uniform and stable passive film on a surface of each of positive electrode film and negative electrode film of an electrochemical energy storage device, particularly the sulfonic ester cyclic quaternary ammonium salt and the dioxide heterocyclic compound can form a dense solid electrolyte interface film (SEI film) with low impedance on the surface of the negative electrode film, thereby reducing a contact between a positive active material and a negative electrode active material of the positive electrode film and the negative electrode film and the electrolyte, thus avoiding a continuous oxidation reaction and reduction reaction of the electrolyte on the surface of each of the positive electrode film and the negative electrode film, thereby weakening decomposition of the electrolyte and preventing internal resistance from increasing, and making the electrochemical energy storage device have excellent high temperature storage performance and high temperature cycle performance. The reason is that during the forming process of the electrochemical energy storage device, a passive film can be formed on the surface of each of the positive electrode film and the negative electrode film, when the electrolyte comprises the sulfonic ester cyclic quaternary ammonium salt, a cationic group of the sulfonic ester cyclic quaternary ammonium salt has a special structure (that is the cationic group of the sulfonic ester cyclic quaternary ammonium salt is composed of a cyclic quaternary ammonium head with unit positive charge and a functional sulfonic ester tail connected through an organic carbon chain therebetween), when reduction potential is 1.5V, the cyclic quaternary ammonium head with unit positive charge can bring whole cationic entire proactively close to the negative electrode film and can preferentially be reduction-decomposed to break bond and release the functional sulfonic ester tail, which can preferentially form a SEI film composed of alkyl sulfonic metal salt ($RSO_3X$) and the like on the surface of the negative electrode film, due to high intrinsic ionic conductivity and high thermal stability of the alkyl sulfonic metal salt, the SEI film thus formed on the surface of the negative electrode film has dense and uniform internal structure, low impedance and excellent high temperature performance, which can improve high temperature storage performance and high temperature cycle performance of the electrochemical energy storage device. The dioxide heterocyclic compound can be oxidized at the positive electrode film, thus can form a passive film on the surface of the positive electrode film with dense and uniform structure and excellent high temperature performance, which can further improve high temperature storage performance and high temperature cycle performance of the electrochemical energy storage device. Therefore, when the sulfonic ester cyclic quaternary ammonium salt and the dioxide heterocyclic compound are added into the electrolyte at the same time, under the combined effect of the sulfonic ester cyclic quaternary ammonium salt and the dioxide heterocyclic compound, the electrochemical energy storage device has excellent high temperature storage performance and high temperature cycle performance.

In the electrolyte according to the first aspect of the present disclosure, in the formula 1, preferably, $R_{11}$ is one selected from a group consisting of C1~C6 alkyl group, C1~C6 alkyl group substituted with the substituent, halogenated C1~C6 alkyl group, halogenated C1~C6 alkyl group substituted with the substituent, $R_{12}$ is one selected from a group consisting of C1~C12 alkylene group, C1~C12 alkylene group substituted with the substituent, $R_{13}$ is one selected from a group consisting of C1~C6 alkyl group, C1~C6 alkyl group substituted with the substituent, halogenated C1~C6 alkyl group, halogenated C1~C6 alkyl group substituted with the substituent, $R_{14}$ is one selected from a group consisting of C1~C2 alkylene group and C1~C2 alkylene group substituted with the substituent.

In the electrolyte according to the first aspect of the present disclosure, the cationic group of the sulfonic ester cyclic quaternary ammonium salt is one selected from a group consisting of

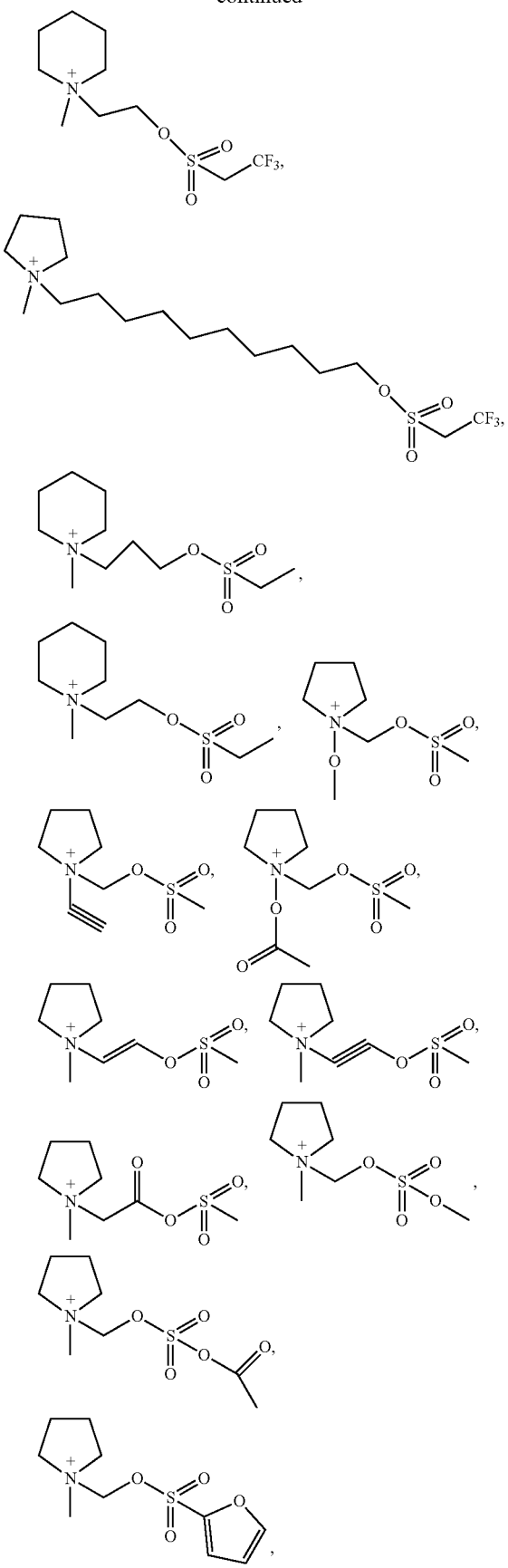

In the electrolyte according to the first aspect of the present disclosure, specifically, the sulfonic ester cyclic quaternary ammonium salt is one or more selected from the following compounds; but the present disclosure is not limited to that:

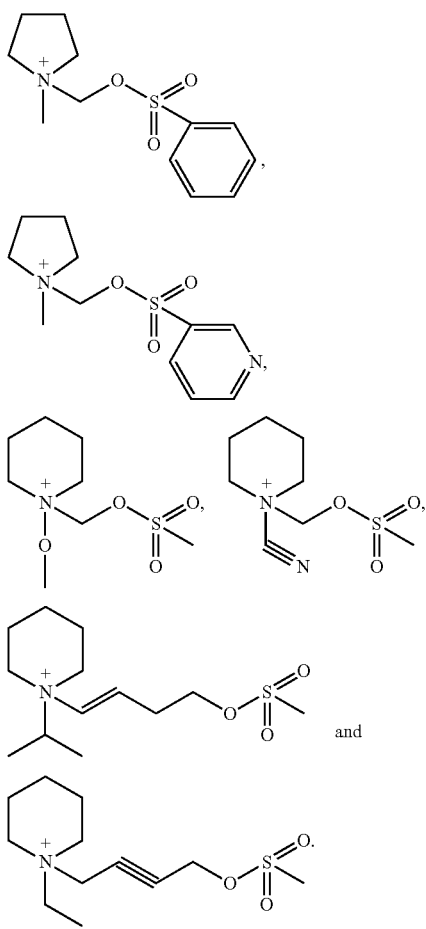

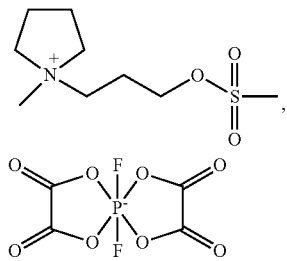

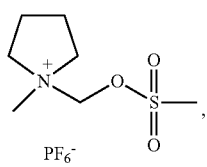

In the electrolyte according to the first aspect of the present disclosure, in formula 2, preferably, a is an integer of 1~2.

In the electrolyte according to the first aspect of the present disclosure, in formula 2, $R_{21}$ and $R_{22}$ may be different from each other, $R_{21}$ and $R_{22}$ also may be identical from each other.

In the electrolyte according to the first aspect of the present disclosure, in formula 2, when a is an integer equal to or greater than 2, except carbon atoms attached to substituents of $R_{21}$ and $R_{22}$, substituents at the rest carbon atom may be identical, or may be completely different, or two or more substituents may be identical, and the substituents are not limited to specific reference numeral. For example, when a is 2, except the carbon atoms attached to substituents of $R_{21}$ and $R_{22}$, four substituents on the rest two carbon atoms may be completely identical, or may be completely different, or any two or more of the four substituents may be identical.

In the electrolyte according to the first aspect of the present disclosure, in formula 3, preferably, b is an integer of 1~2.

In the electrolyte according to the first aspect of the present disclosure, in formula 3, $R_{31}$, $R_{32}$ and $R_{35}$ may be different from each other, and also may be identical with each other, or two of $R_{31}$, $R_{32}$ and $R_{35}$ may be identical.

In the electrolyte according to the first aspect of the present disclosure, in formula 3, when b is an integer greater than 2, except carbon atoms attached to substituents of $R_{31}$, $R_{32}$ and $R_{35}$, substituents on rest carbon atom may be identical, or may be completely different, or two or more substituents may be identical, and the substituents are not limited to specific reference numerals. For example, when b is 2, except carbon atoms attached to substituent group of $R_{31}$, $R_{32}$ and $R_{35}$, for substituents on the rest two carbon atoms may be completely identical, or may be completely different, or any two or more of the four substituents may be identical.

In the electrolyte according to the first aspect of the present disclosure, in formula 2 and formula 3, C1~C20 alkyl group may be chain alkyl group, or may be cyclic alkyl group. The chain alkyl group further comprises straight chain alkyl group and branched chain alkyl group, C1~C20 alkyl group preferably is selected from straight chain alkyl group. Preferably, C1~C20 alkyl group is selected from C1~C10 alkyl group, further preferably, C1~C20 alkyl group is selected from C1~C5 alkyl group, more preferably, C1~C20 alkyl group is selected from C1~C3 alkyl group. Specifically, C1~C20 alkyl group may be one selected from a group consisting of methyl, ethyl, n-propyl, isopropyl, cyclopropyl, n-butyl, isobutyl, sec-butyl, tert-butyl, n-pentyl, isopentyl, neopentyl, cyclopentyl, n-hexyl, isohexyl, cyclohexyl, heptyl, cycloheptyl, octyl, cyclooctyl, nonyl, decyl, undecyl, dodecyl, tridecyl, tetradecyl, pentadecyl, hexadecyl, heptadecyl, octadecyl, nonadecyl and eicosyl.

In the electrolyte according to the first aspect of the present disclosure, in formula 2 and formula 3, the number and location of the halogen atom in halogenated C1~C20 alkyl group are not particularly limited and some hydrogen atoms or all hydrogen atoms of the C1~C20 alkyl group may be substituted according to actual demand. For example, the number of the halogen atom of halogenated C1~C20 alkyl group may be 1, 2, 3 or 4. When the number of the halogen atom is more than 1, the types of the halogen atoms may be identical, or may be completely different, or some may be identical. Preferably, halogenated C1~C20 alkyl group may be one selected from a group consisting of

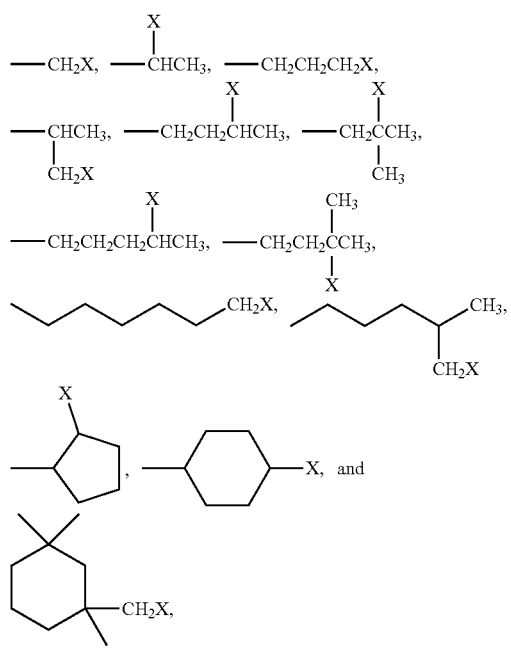

where, X is one selected from F, Cl, Br and I, preferably, X is selected from F or Cl.

In the electrolyte according to the first aspect of the present disclosure, in formula 2 and formula 3, C2~C20 unsaturated hydrocarbyl group may comprise chain unsaturated hydrocarbyl group and cyclic unsaturated hydrocarbyl group, specific type thereof is not particularly limited and is selected according to actual demand, preferably, C2~C20 unsaturated hydrocarbyl group is selected from chain unsaturated hydrocarbyl group, further preferably, C2~C20 unsaturated hydrocarbyl group is selected from alkenyl group and alkynyl group. The number of unsaturated bond and position of unsaturated bond of the unsaturated hydrocarbyl group are not particularly limited and is selected according to actual situation. For example, the number of the unsaturated bond may be 1, 2, 3 or 4. Preferably, the unsaturated bond is located at terminus of C2~C20 unsaturated hydrocarbyl group, here, the terminus of the unsaturated hydrocarbyl group is away from the position where C2~C20 unsaturated hydrocarbyl group is connected with the dioxide heterocyclic compound. For example, when the number of the unsaturated bond is 1, the unsaturated bond is located at terminus of the unsaturated hydrocarbyl group. When the number of carbon atom of C2~C20 unsaturated hydrocarbyl group is greater than 3, carbon atom of unsaturated bond is not connected with the dioxide heterocyclic compound. Preferably, C2~C20 unsaturated hydrocarbyl group is selected from C2~C10 unsaturated hydrocarbyl group, further preferably, C2~C20 unsaturated hydrocarbyl group is selected from C2~C5 unsaturated hydrocarbyl group, more preferably, C2~C20 unsaturated hydrocarbyl group is selected from C2~C3 unsaturated hydrocarbyl group. Specifically, C2~C20 unsaturated hydrocarbyl group may be one selected from a group consisting of —CH═CH$_2$, —CH$_2$—CH═CH$_2$, CH$_2$CH$_2$—CH═CH$_2$, —CH$_2$CH$_2$CH$_2$—CH═CH$_2$, —C≡CH, —CH$_2$—C≡CH, —CH$_2$CH$_2$—C≡CH, —CH$_2$CH$_2$CH$_2$—C≡CH and —CH═CH—CH═CH$_2$.

In the electrolyte according to the first aspect of the present disclosure, in formula 2 and formula 3, in halogenated C2~C20 unsaturated hydrocarbyl group, the number and location of halogen atom are not particularly limited and some hydrogen atoms or all hydrogen atoms of C2~C-20 unsaturated hydrocarbyl group may be substituted according to actual demand. For example, the number of halogen atom may be 1, 2, 3 or 4. When the number of halogen atom is greater than 1, types of the halogen atoms may be identical, or may be completely different, or some may be identical. Preferably, halogenated C2~20 unsaturated hydrocarbyl group may be one selected from a group consisting of —C≡C—X, —CH$_2$—C≡C—X, —CH$_2$CH$_2$—C≡C—X, —CH$_2$CH$_2$CH$_2$—C≡C—X,

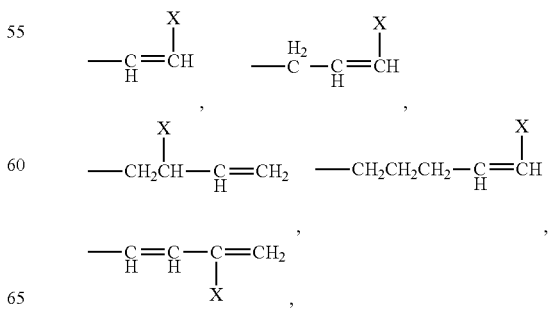

where, X is one selected from F, Cl, Br and I, preferably, X is selected from F or Cl.

In the electrolyte according to the first aspect of the present disclosure, in formula 2 and formula 3, preferably, $R_{21}$, $R_{22}$, $R_{23}$, $R_{24}$, $R_{31}$, $R_{32}$, $R_{33}$, $R_{34}$ and $R_{35}$ each independently are one selected from a group consisting of H, F, Cl, C1~C10 alkyl group, halogenated C1~C10 alkyl group, C2~C10 unsaturated hydrocarbyl group and halogenated C2~C10 unsaturated hydrocarbyl group, where the halogen atom is selected from F or Cl. Further preferably, $R_{21}$, $R_{22}$, $R_{23}$, $R_{24}$, $R_{31}$, $R_{32}$, $R_{33}$, $R_{34}$ and $R_{35}$ each independently are one selected from a group consisting of H, C1~C5 alkyl group, halogenated C1~C5 alkyl group, C2~C5 unsaturated hydrocarbyl group and halogenated C2~C5 unsaturated hydrocarbyl group, where the halogen atom is selected from F or Cl. More preferably, $R_{21}$, $R_{22}$, $R_{23}$, $R_{24}$, $R_{31}$, $R_{32}$, $R_{33}$, $R_{34}$ and $R_{35}$ each independently are one selected from H, C1~C3 alkyl group, C2~C3 alkenyl group and C2~C3 alkynyl group.

In the electrolyte according to the first aspect of the present disclosure, specifically, the dioxide heterocyclic compound is one or more selected from a group consisting of following compounds, but the present disclosure is not limited to that;

compound 2-1

compound 2-2
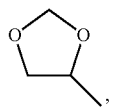

compound 2-3
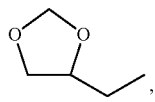

compound 2-4
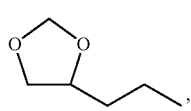

compound 2-5
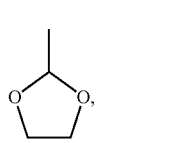

compound 2-6

compound 2-7
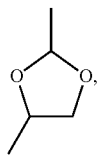

-continued compound 2-8
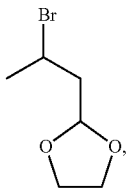

compound 2-9

compound 2-10
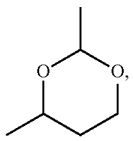

compound 2-11
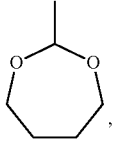

compound 2-12
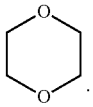

In the electrolyte according to the first aspect of the present disclosure, if a content of the sulfonic ester cyclic quaternary ammonium salt is too low, the passive film formed on the positive electrode film and the passive film formed on the negative electrode film are insufficient to avoid further reaction of the electrolyte and improvement of performance of the electrochemical energy storage device is not obvious; if the content of the sulfonic ester cyclic quaternary ammonium salt is too high, impedance of the passive film formed on the positive electrode film and impedance of the passive film formed on the negative electrode film will be increased, thus deteriorating performance of the electrochemical energy storage device. Preferably, the content of the sulfonic ester cyclic quaternary ammonium salt is 0.05%~10% of the total mass of the electrolyte. Further preferably, the content of the sulfonic ester cyclic quaternary ammonium salt is 0.1%~5% of the total mass of the electrolyte.

In the electrolyte according to the first aspect of the present disclosure, if a content of the dioxide heterocyclic compound is too low, the passive film formed on the positive electrode film by the dioxide heterocyclic compound is not dense enough and cannot effectively inhibit oxidation and reduction reaction between the electrolyte and the positive electrode active material, and in turn cannot further improve high temperature storage performance of the electrochemical energy storage device; if the content of the dioxide heterocyclic compound is too high, the passive film formed on the positive electrode film by the dioxide heterocyclic compound may be too thick and impede normal intercalation-deintercalation process of active metal ion, therefore, capacity of the electrochemical energy storage device will be adversely affected and high temperature cycle performance of the electrochemical energy storage device will be seriously affected. Preferably, the content of the dioxide heterocyclic compound is 0.05%~10% of the total mass of the electrolyte. Further preferably, the content of the dioxide heterocyclic compound is 0.5%~5% of the total mass of the electrolyte.

In the electrolyte according to the first aspect of the present disclosure, because liquid electrolyte, solid polymer electrolyte and gel polymer electrolyte are similar in action mechanism, only the liquid electrolyte is taken as an example for description in the present disclosure, that is in the following description, the electrolytes all refer to the liquid electrolyte.

In the electrolyte according to the first aspect of the present disclosure, a concentration of the electrolyte salt is not particularly limited and may be selected according to actual demand. Specifically, a content of the electrolyte salt is 6%~25% of the total mass of the electrolyte. Preferably, the content of the electrolyte salt is 6%~20% of the total mass of the electrolyte. Further preferably, the content of the electrolyte salt is 10%~15% of the total mass of the electrolyte.

In the electrolyte according to the first aspect of the present disclosure, the electrolyte salt of the electrolyte may be selected from lithium salt or sodium salt.

In the electrolyte according to the first aspect of the present disclosure, a type of the lithium salt is not particularly limited and may be selected according to actual demand. Preferably, the lithium salt at least comprises $LiPF_6$, the lithium salt may further comprise one or more selected from a group consisting of $LiBF_4$, $LiClO_4$, $LiAsF_6$, $LiSbF_6$, LiBOB, LiDFOB, $LiN(SO_2F)_2$, LiTFSI, $LiPO_2F_2$, LiTFOP, $LiN(SO_2RF)_2$ and $LiN(SO_2F)(SO_2RF)$, where $RF=C_nF_{2n+1}$, that is $R_F$ represents saturated perfluoroalkyl group, n is an integer of 1~10.

In the electrolyte according to the first aspect of the present disclosure, a type of the sodium salt is not particularly limited and may be selected according to actual demand. Specifically, the sodium salt may be one or more selected from a group consisting of $NaPF_6$, $NaBF_4$, $NaClO_4$, $NaAsF_6$, $NaCF_3SO_3$, $NaN(C_2F_5SO_2)_2$, $NaN(C_2F_5SO_2)_2$ and $NaN(FSO)_2$.

In the electrolyte according to the first aspect of the present disclosure, the electrolyte further comprises an organic solvent, a type of the organic solvent is not particularly limited and may be selected according to actual demand. Preferably, the organic solvent is non-aqueous organic solvent. The non-aqueous organic solvent may comprise any kind of carbonate and/or carboxylate. The carbonate may comprise cyclic carbonate ester or chain carbonate ester. The non-aqueous organic solvent may further comprise halogenated carbonate ester. Specifically, the organic solvent may be one or more selected from a group consisting of ethylene carbonate, propylene carbonate, butylene carbonate, pentylene carbonate, fluoroethylene carbonate, dimethyl carbonate, diethyl carbonate, dipropyl carbonate, ethyl methyl carbonate, methyl formate, ethyl formate, ethyl acetate, propyl propionate, ethyl propionate, γ-butyrolactone and tetrahydrofuran.

Next an electrochemical energy storage device according to a second aspect of the present disclosure is described.

The electrochemical energy storage device according to the second aspect of the present disclosure comprises the electrolyte according to the first aspect of the present disclosure.

In the electrochemical energy storage device according to the second aspect of the present disclosure, the electrochemical energy storage device further comprises a positive electrode plate, a negative electrode plate, a separator and a package case.

It should be noted that, the electrochemical energy storage device may be a lithium-ion battery, a sodium-ion battery, a zinc-ion battery or a supercapacitor. In examples of the present disclosure, the described electrochemical energy storage device is a lithium-ion battery, but the present disclosure is not limited to that.

In the lithium-ion battery, the positive electrode plate comprises a positive electrode current collector and a positive electrode film provided on the positive electrode current collector. The positive electrode film comprises a positive electrode active material, the positive electrode film further comprises a conductive agent and a binder. The positive electrode active material may be one or more selected from a group consisting of lithium cobalt oxide ($LiCoO_2$), lithium nickel oxide ($LiNiO_2$), spinel-type lithium manganese dioxide ($LiMn_2O_4$), olivine-type $LiMPO_4$ and $Li_aNi_xA_yB_{(1-x-y)}O_2$. Here, in olivine-type $LiMPO_4$, M is one or more selected from a group consisting of Co, Ni, Fe, Mn and V; In $Li_aNi_xA_yB_{(1-x-y)}O_2$, A and B each independently are one selected from a group consisting of Co, Al and Mn, and A and B is different, $0.95 \le a \le 1.2$, $0<x<1$, $0<y<1$, and $x+y<1$. A type of the conductive agent and the binder is not particularly limited and may be selected according to actual demand.

In the lithium-ion battery, the negative electrode plate comprises a negative electrode current collector and a negative electrode film provided on negative electrode current collector. The negative electrode film comprises a negative electrode active material, the negative electrode film further comprises a conductive agent and a binder. The negative electrode active material may be selected from materials that lithium-ion can be intercalated under voltage less than 2V (vs. $Li/Li^-$). Specifically, the negative electrode active material may be one or more selected from a group consisting of natural graphite, artificial graphite, mesocarbon microbead (abbreviated as MCMB), hard carbon, soft carbon, silicon, silicon-carbon composite, Li—Sn alloy, Li—Sn—O alloy, Sn, SnO, $SnO_2$, spinel-type lithiation $TiO_2$—$Li_4Ti_5O_{12}$ and Li—Al alloy. A type of the conductive agent and the binder is not particularly limited and may be selected according to actual demand. The negative electrode plate can also directly use lithium metal plate.

In the lithium-ion battery, a type of the separator is not particularly limited and may be selected according to actual demand, specifically, the separator may be selected from a polyethylene film, a polypropylene film, a polyvinylidene fluoride film and a multilayer composite films thereof.

Hereinafter the present disclosure will be described in detail in combination with examples. It should be noted that, the examples described in the present disclosure are only used for explaining the present disclosure, and are not intended to limit the present disclosure. In the examples, only a lithium-ion battery as the electrochemical energy storage device is described, but the present disclosure is not limited to that.

In the following example, the reagents, materials and instruments used are commercially available unless otherwise specified. The sulfonic ester cyclic quaternary ammonium salt used may refer to Chinese patent application publication No. CN105845981A published in Aug. 10, 2016.

The lithium-ion batteries of examples 1~11 and comparative examples 1~7 were all prepared as follows.

(1) Preparation of a positive electrode plate: lithium cobalt oxide (positive electrode active material, $LiCoO_2$), acetylene black (conductive agent), polyvinylidene fluoride (binder) according to a mass ratio of 98:1:1 were mixed with N-methyl-2-pyrrolidone (solvent) under vacuum mixer to form a stable and uniform positive electrode slurry; then the positive electrode slurry was uniformly coated on an aluminum foil (positive electrode current collector) with a thickness of 12 μm; drying under room temperature was then performed, which was followed by moving the aluminum foil to an oven for baking 1 h under 120° C., then after cold-pressing and slitting, the positive the electrode plate was obtained.

(2) Preparation of a negative electrode plate: artificial graphite (negative electrode active material), sodium carboxymethylcellulose (thickening agent, CMC), styrene butadiene rubber (binder) according to a mass ratio of 98:1:1 were mixed with deionized water under vacuum mixer to form a negative electrode slurry; then the negative electrode slurry was uniformly coated on a copper foil (negative electrode current collector) with a thickness of 8 μm; drying under room temperature was then performed, which was followed by moving the copper foil to an oven for baking 1 h under 120° C., then after cold-pressing and slitting, the negative electrode plate was obtained.

(3) Preparation of an electrolyte: in an argon atmosphere glove box in which the water content was less than 10 ppm, ethylene carbonate (EC), propylene carbonate (PC), diethyl carbonate(DEC) according to a volume ratio of EC:PC:DEC=1:1:1 were mixed as a mixed organic solvent, then fully dried lithium salt $LiPF_6$ was dissolved into the mixed organic solvent, next the sulfonic ester cyclic quaternary ammonium salt and the dioxide heterocyclic compound were added, after uniformly mixing, the electrolyte was obtained. Here, a content of $LiPF_6$ was 12.5% of the total mass of the electrolyte. The type and the content of the sulfonic ester cyclic quaternary ammonium salt and the dioxide heterocyclic compound of the electrolyte was shown in table 1, and in table 1, the contents of the sulfonic ester cyclic quaternary ammonium salt and the dioxide heterocyclic compound were mass percent based on the total mass of the electrolyte.

(4) Preparation of a separator: a polypropylene separator with a thickness of 16 μm (model A273, provided by Celgard Company) was used as the separator.

(5) Preparation of a lithium-ion battery: the positive electrode plate, the separator, the negative electrode plate were laminated in order so as to make the separator positioned between the positive electrode plate and the negative electrode plate and separate the positive electrode film and negative electrode film, then were wound to form an electrode assembly and placed in a package case, next the prepared electrolyte was injected into the dried electrode assembly, after vacuum packaging, standing-by, forming, shaping and the like, the lithium-ion battery was obtained.

TABLE 1

Parameters of examples 1~11 and comparative examples 1~7

| | Sulfonic ester cyclic quaternary ammonium salt | | Dioxide heterocyclic compound | |
|---|---|---|---|---|
| | Type | Content/% | Type | Content/% |
| Example 1 | Compound 1-1 | 0.05 | Compound 2-1 | 1 |
| Example 2 | Compound 1-1 | 0.1 | Compound 2-1 | 1 |
| Example 3 | Compound 1-1 | 5 | Compound 2-1 | 1 |
| Example 4 | Compound 1-1 | 10 | Compound 2-1 | 1 |
| Example 5 | Compound 1-1 | 1 | Compound 2-1 | 0.05 |
| Example 6 | Compound 1-1 | 1 | Compound 2-1 | 1 |
| Example 7 | Compound 1-1 | 1 | Compound 2-1 | 5 |
| Example 8 | Compound 1-1 | 1 | Compound 2-1 | 10 |
| Example 9 | Compound 1-3 | 1 | Compound 2-9 | 1 |
| Example 10 | Compound 1-3 | 1 | Compound 2-11 | 1 |
| Example 11 | Compound 1-3 | 1 | Compound 2-12 | 1 |
| Comparative example 1 | — | — | — | — |
| Comparative example 2 | Compound 1-1 | 1 | — | — |
| Comparative example 3 | — | — | Compound 2-1 | 1 |
| Comparative example 4 | Compound 1-1 | 0.03 | Compound 2-1 | 1 |
| Comparative example 5 | Compound 1-1 | 11 | Compound 2-1 | 1 |
| Comparative example 6 | Compound 1-1 | 1 | Compound 2-1 | 0.03 |
| Comparative example 7 | Compound 1-1 | 1 | Compound 2-1 | 11 |

Finally, test processes and test results of the lithium-ion batteries were described (1) Texting of High Temperature Storage Performance of the Lithium-Ion Battery At 25° C., the lithium-ion battery was charged to a voltage of 4.4V at a constant current of 0.5 C, then the lithium-ion battery was charged to a current of 0.05 C at a constant voltage of 4.4V, a thickness of the lithium-ion battery this time was tested and marked as h0; after the lithium-ion battery being stored in a thermotank for 30 days under 60° C., the lithium-ion battery was taken out to test the thickness and the thickness was marked as h1. Fifteen lithium-ion batteries were tested in each group to take an average value.

Thickness expansion rate after stored for 30 days under 60° C. of the lithium-ion battery (%)= [(h1−h0)/h0]×100%.

(2) Testing of High Temperature Cycle Performance of the Lithium-Ion Battery

At 45° C., the lithium-ion battery was firstly charged to a voltage of 4.4V at a constant current of 1 C, then the lithium-ion battery was further charged to a current of 0.05 C at a constant voltage of 4.4V, next the lithium-ion battery was discharged to a voltage of 3.0V at a constant current of 1 C, this was a charge-discharge cycle process, the discharge capacity this time was the discharge capacity of the first cycle. Then the cycle process was repeated for 300 times, the discharge capacity of $300^{th}$ cycle was tested and obtained.

Capacity retention after 300 cycle under 45° C. of the lithium-ion battery (%)=(discharge capacity of $300^{th}$ of the lithium-ion battery/discharge capacity of the first cycle of the lithium-ion battery)×100%.

TABLE 2

Test results of examples 1~11 and comparative examples 1~7

| | Thickness expansion rate after stored for 30 days under 60° C. | Capacity retention after 300 cycle under 45° C. |
|---|---|---|
| Example 1 | 15.57% | 64.66% |
| Example 2 | 14.12% | 66.88% |
| Example 3 | 12.19% | 72.35% |
| Example 4 | 9.91% | 63.90% |
| Example 5 | 35.11% | 70.13% |
| Example 6 | 17.15% | 70.15% |
| Example 7 | 12.79% | 70.19% |
| Example 8 | 8.95% | 65.13% |
| Example 9 | 16.89% | 71.81% |
| Example 10 | 17.98% | 69.96% |
| Example 11 | 17.08% | 68.72% |
| Comparative example 1 | 42.50% | 63.70% |
| Comparative example 2 | 38.70% | 70.10% |
| Comparative example 3 | 19.54% | 63.77% |
| Comparative example 4 | 19.52% | 63.78% |
| Comparative example 5 | 8.93% | 60.50% |
| Comparative example 6 | 38.02% | 70.12% |
| Comparative example 7 | 5.40% | 61.34% |

It could be seen from related data in table 2, under the combined effect of the sulfonic ester cyclic quaternary ammonium salt and the dioxide heterocyclic compound, the lithium-ion battery had excellent high temperature storage performance and high temperature cycle performance.

In comparative examples 1~3, the sulfonic ester cyclic quaternary ammonium salt and the dioxide heterocyclic compound were not added into the electrolyte of comparative example 1, high temperature storage performance and high temperature cycle performance of the lithium-ion battery were both poor; when only the sulfonic ester cyclic quaternary ammonium salt was added into the electrolyte (comparative example 2), high temperature cycle performance and high temperature storage performance of the lithium-ion battery could both be improved to a certain extent, here, the improvement of high temperature cycle performance of the lithium-ion battery was more obvious, but the improvement of high temperature storage performance was relatively not obvious; when only the dioxide heterocyclic compound was added into the electrolyte (comparative example 3), high temperature storage performance of the lithium-ion battery could be improved significantly, and high temperature cycle performance of the lithium-ion battery could be improved slightly at the same time.

In examples 1~11 and comparative examples 4~7, the sulfonic ester cyclic quaternary ammonium salt and the dioxide heterocyclic compound were added into the electrolyte at the same time, the lithium-ion battery had excellent high temperature storage performance and high temperature cycle performance meanwhile. This was because of the sulfonic ester cyclic quaternary ammonium salt and the dioxide heterocyclic compound could form a dense, uniform and stable passive film on the surface of each of the positive electrode film and the negative electrode film, particularly a dense solid electrolyte interface film with low impedance could be formed on the surface of the negative electrode film, thereby reducing the contact between the positive electrode active material and the negative electrode active material of the positive electrode film and negative electrode film and the electrolyte, therefore the occurrence of oxidation and reduction reaction of the electrolyte on the surface of each of the positive electrode film and negative electrode film could be avoided, and then the decomposition of the electrolyte and the increase of internal impedance of lithium-ion battery could be weaken, so as to make the lithium-ion battery has excellent high temperature storage performance and high temperature cycle performance at the same time. It could be understood that, changes of specific type and specific content of the sulfonic ester cyclic quaternary ammonium salt and the dioxide heterocyclic compound would directly impact performance of the electrolyte, thereby would affect improvement effects of the lithium-ion battery.

In comparative example 4, the content of the sulfonic ester cyclic quaternary ammonium salt was insufficient, the improvement of high temperature cycle performance of the lithium-ion battery was not obvious. In examples 1~4 and example 6, as the content of the sulfonic ester cyclic quaternary ammonium salt increased, thickness expansion rate of high temperature storage of the lithium-ion battery was maintained lower and relatively stable, capacity retention of high temperature cycle of the lithium-ion battery could be improved. When the content of the sulfonic ester cyclic quaternary ammonium salt was too high, for example in comparative example 5, high temperature cycle performance of the lithium-ion battery was obviously deteriorated.

In comparative example 6, the content of the dioxide heterocyclic compound was insufficient, the improvement of high temperature storage performance of the lithium-ion battery was relatively weak. In example 5~8, as the content of the dioxide heterocyclic compound content increased, capacity retention of high temperature cycle of the lithium-ion battery was maintained stable substantially, thickness expansion rate of high temperature storage of the lithium-ion battery was improved significantly. But when the content the dioxide heterocyclic compound was too high, for example in comparative example 7, high temperature cycle performance of the lithium-ion battery was obviously deteriorated.

Therefore, too low or too high content of the sulfonic ester cyclic quaternary ammonium salt and too low or too high content of the dioxide heterocyclic compound were not beneficial to improve performance of the lithium-ion battery generally, but for some non-high requirements, they could also improve high temperature storage performance and high temperature cycle performance of the lithium-ion battery to a certain extent.

According to the revelations of the present disclosure, a person skilled in the art may also make appropriate variations and modifications to the above embodiments. Therefore, the present disclosure is not limited to the specific embodiments disclosed and described in the above, modifications and variations of the present disclosure will also be fallen within the scope of the appended claims of the present disclosure.

What is claimed:
1. An electrolyte, comprising:
an electrolyte salt; and
an additive;
wherein the additive comprises a sulfonic ester cyclic quaternary ammonium salt and a dioxide heterocyclic compound;

the sulfonic ester cyclic quaternary ammonium salt is

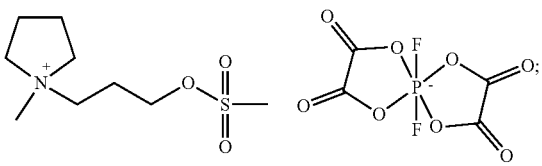

the dioxide heterocyclic compound is

a content of the sulfonic ester cyclic quaternary ammonium salt is 1%~5% of the total mass of the electrolyte;
a content of the dioxide heterocyclic compound is 1%~5% of a total mass of the electrolyte.

2. An electrochemical energy storage device, comprising an electrolyte;
the electrolyte comprising an electrolyte salt and an additive;
wherein the additive comprises a sulfonic ester cyclic quaternary ammonium salt and a dioxide heterocyclic compound;
the sulfonic ester cyclic quaternary ammonium salt is

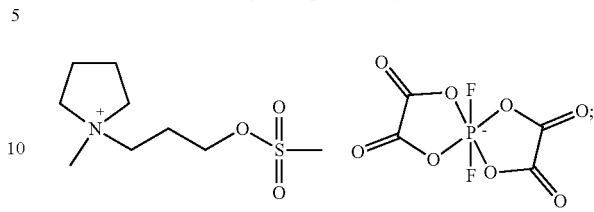

the dioxide heterocyclic compound is

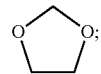

a content of the sulfonic ester cyclic quaternary ammonium salt is 1%~5% of the total mass of the electrolyte;
a content of the dioxide heterocyclic compound is 1%~5% of a total mass of the electrolyte.

* * * * *